United States Patent [19]

Takahashi et al.

[11] Patent Number: 5,122,703
[45] Date of Patent: Jun. 16, 1992

[54] INTEGRALLY MOLDED ARMATURE FOR SWING-TYPE ACTUATOR

[75] Inventors: Fumihiko Takahashi, Manuma; Koichi Oda, Ageo; Saburo Okada, Fukaya, all of Japan

[73] Assignee: 501 Hitachi Metals, Ltd., Tokyo, Japan

[21] Appl. No.: 729,879

[22] Filed: Jul. 11, 1991

Related U.S. Application Data

[63] Continuation of Ser. No. 539,223, Jun. 18, 1990, abandoned.

Foreign Application Priority Data

Jun. 21, 1989 [JP] Japan .............. 1-72492[U]
Dec. 19, 1989 [JP] Japan .............. 1-146034[U]
Mar. 22, 1990 [JP] Japan .............. 2-29330[U]

[51] Int. Cl.⁵ .................. G11B 21/08; H02K 33/16; H02K 35/04
[52] U.S. Cl. ........................ 310/36; 310/43; 310/208; 335/222; 360/107
[58] Field of Search .......... 29/598; 310/13, 15, 310/36, 43, 116, 208, 261; 264/292.19; 335/222; 336/110; 360/107

[56] References Cited

U.S. PATENT DOCUMENTS

| | | | |
|---|---|---|---|
| 4,553,058 | 11/1985 | Iwasaki | 29/598 |
| 4,639,624 | 1/1987 | Ejiri et al. | 335/222 |
| 4,855,853 | 8/1989 | Matsushita et al. | 360/106 |
| 4,951,023 | 8/1990 | Erd et al. | 335/222 |

FOREIGN PATENT DOCUMENTS

| | | | |
|---|---|---|---|
| 60-159566 | 5/1985 | Japan | 310/36 |
| 64-89946 | 1/1989 | Japan | 310/36 |

Primary Examiner—Steven L. Stephan
Assistant Examiner—D. L. Rebsch
Attorney, Agent, or Firm—Finnegan, Henderson, Farabow, Garrett & Dunner

[57] ABSTRACT

A swing-type actuator comprising (a) a housing comprising two yokes and permanent magnets attached to the yokes with their different magnetic poles opposing each other, a magnetic gap existing between the opposing permanent magnets; and (b) a swingable arm having one end to which a movable coil is fixed and the other end to which a function member is fixed, such that the movable coil is swingable in the magnetic gap, the movable coil being integrally fixed to the arm by a hold member made of a thermoplastic resin having a modulus of $10^5$ kg/cm² or more.

23 Claims, 5 Drawing Sheets

INTEGRALLY MOLDED ARMATURE FOR SWING-TYPE ACTUATOR

This application is a continuation of application Ser. No. 07/539,223, filed June 18, 1990, now abandoned.

BACKGROUND OF THE INVENTION

The present invention relates to a swing-type actuator such as an actuator for magnetic disk drives, and more particularly to a swing-type actuator capable of swinging a function member such as a magnetic head along a circular course.

Conventionally, the positioning of a magnetic head on a recording track of a magnetic disk, etc. is conducted by a swing-type or rotation-type actuator as shown in FIGS. 9, 10. In both figures, a yoke 1 is fixedly provided with permanent magnets 2, and a pair of yokes 1 are assembled by supports 3 such that different magnetic poles of the permanent magnets 2 are opposite each other across a magnetic gap 4 to form a magnetic circuit. Arm 5 has one end to which a flat movable coil 6 is fixed, and the other end to which a magnetic head (not shown) is fixed. The arm 5 is arranged such that the movable coil 6 located in the magnetic gap 4 can swing around a shaft 7. When an operation signal is supplied to the movable coil 6, a magnetic force generated from the movable coil 6 according to Fleming's left hand rule functions as an attraction force or a repulsion force on each permanent magnet 2, so that the arm 5 is rotated around the shaft 7. As a result, a magnetic head fixed to a tip end of the arm 5 is positioned on a desired magnetic track of a magnetic disk (not shown). The direction of the rotation of the arm 5 can be changed by inverting the direction of current applied to the movable coil 6.

In the above conventional actuator for magnetic disk drives, the movable coil 6 is usually fixed to the arm 5 by an adhesive. However, the fixing of the movable coil 6 by an adhesive is sometimes troublesome, failing to provide accurate positioning of the movable coil 6. In addition, handling of terminals of the movable coil 6 is complicated, lowering the productivity of assembling arm 5. Since there is an increasingly higher demand for miniaturization and reduction in thickness of magnetic disk drives, it is necessary to improve the positioning accuracy of the movable coil 6, and the productivity and reliability of fixing of the movable coil 6 to the arm 5. In this sense, the conventional arms fail to satisfy these requirements.

Attempts have been made to integrally fix a movable coil to an arm by resin molding (for instance, Japanese Patent Laid-Open No. 1-89946 and U.S. Pat. No. 4,855,853). In such a structure, the movable coil can be easily fixed, and the thickness of the movable coil can be greatly reduced. Accordingly, such a structure is advantageous for miniaturizing actuators.

However, the conventional resin molding fails to show sufficient mechanical strength and sufficient adhesion to an arm and a movable coil. Further, in the molding, terminals of a movable coil are likely to contact each other or the arm, resulting in a short circuit.

OBJECT AND SUMMARY OF THE INVENTION

An object of the present invention is to provide a small and thin swing-type actuator in which a movable coil is strongly fixed to an arm, whereby the above-mentioned problems inherent in the conventional technology can be eliminated.

Another object of the present invention is to provide a swing-type actuator having improved electric insulation.

The swing-type actuator according to one embodiment of the present invention comprises (a) a housing comprising two yokes and permanent magnets attached to the yokes with their different magnetic poles opposing to each other, a magnetic gap existing between the opposing permanent magnets; and (b) a swingable arm having one end to which a movable coil is fixed and the other end to which a function member is fixed, such that the movable coil is swingable in the magnetic gap, the movable coil being integrally fixed to the arm by a hold member made of a thermoplastic resin having a modulus of $10^5$ kg/cm$^2$ or more.

The swing-type actuator according to another embodiment of the present invention comprises (a) a housing comprising two yokes and permanent magnets attached to the yokes with their different magnetic poles opposing each other, a magnetic gap existing between the opposing permanent magnets; and (b) a swingable arm having one end to which a movable coil is fixed and the other end to which a function member is fixed, such that the movable coil is swingable in the magnetic gap, the movable coil being integrally fixed to the arm by a hold member made of a thermoplastic resin, and the arm being provided with at least one finger which is embedded in the hold member to prevent the arm from being detached from the hold member.

The swing-type actuator according to a further embodiment of the present invention comprises (a) a housing comprising two yokes and permanent magnets attached to the yokes with their different magnetic poles opposing to each other, a magnetic gap existing between the opposing permanent magnets; (b) a swingable arm having one end to which a movable coil is fixed and the other end to which a function member is fixed, such that the movable coil is swingable in the magnetic gap; and (c) a terminal block made of a thermoplastic resin and having a pair of terminal pins electrically connected to lead wires of the movable coil, and a partition projecting near the terminal pins for separating a pair of lead wires from each other, the arm, the movable coil and the terminal block being integrally fixed by a hold member made of a thermoplastic resin.

BRIEF DESCRIPTION OF THE DRAWINGS

FIG. 6 (b) is a cross-sectional view taken along the line B—B in FIG. 6 (a);

FIG. 8 (b) is a partial side view showing an important portion in FIG. 8 (a);

DETAILED DESCRIPTION OF THE PREFERRED EMBODIMENTS

Figure 1:
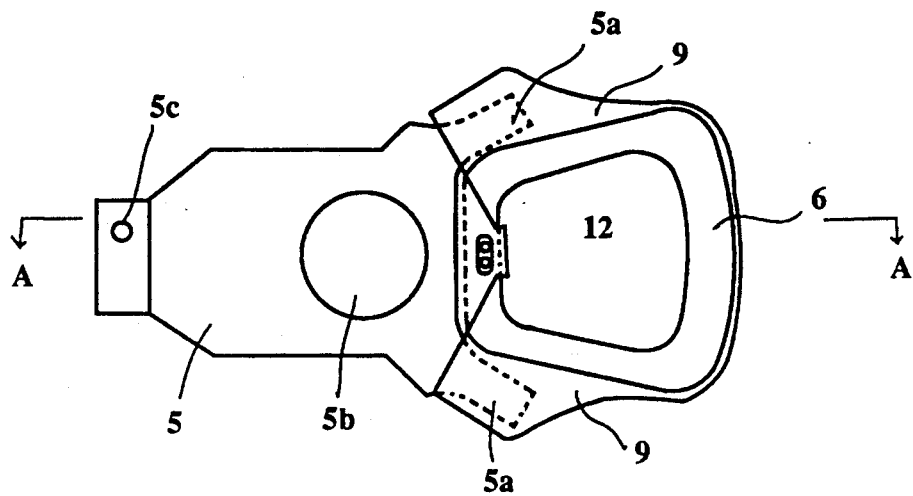
FIG. 1 is a plan view showing the swing-type actuator according to one embodiment of the present invention.
Figure 2:
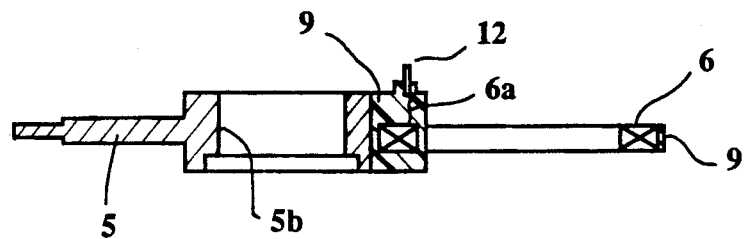
FIG. 2 is a cross-sectional view taken along the line A—A in FIG. 1.
Figure 9:
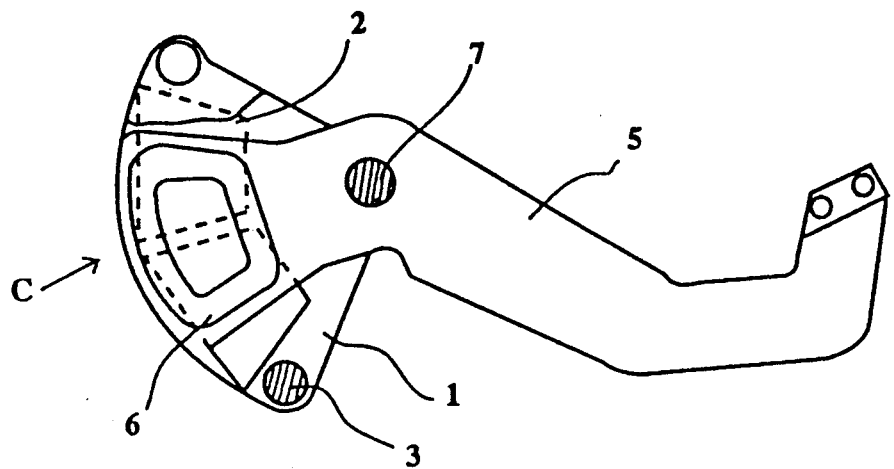
FIG. 9 is a partially cross-sectional plan view showing a conventional swing-type actuator.
Figure 10:
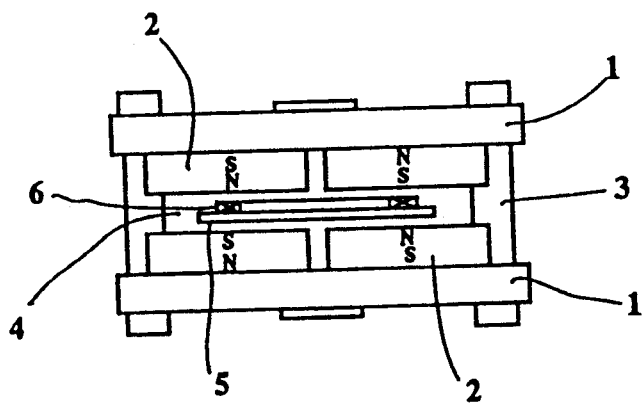
FIG. 10 is a side view of the swing-type actuator of FIG. 9 when viewed from C.

Referring to FIGS. 1 and 2 in which the same reference numerals are assigned to the same parts as those in FIGS. 9 and 10, an arm 5, which may be produced from a die-cast aluminum alloy, has an aperture 5b in a center portion. A shaft (not shown) is rotatably fitted in the aperture 5b, so that the arm 5 is rotatably supported by a housing (not shown). The arm 5 is also provided with an aperture 5c at one end for mounting a function member (not shown) such as a magnetic head to the arm 5, and fingers 5a at the other end for fixedly supporting a hold member 9. The hold member 9 is made of a thermoplastic resin and encompasses the fingers 5a of the arm 5 and the movable coil 6. Thus, the hold member 9 can integrally fix the movable coil 6 to the arm 5. 12 represents terminal pins, and 6a represents lead wires of the movable coil 6. Incidentally, the movable coil 6 can be produced by winding a self-melting wire which has a self-melting coating around a core wire at a predetermined number of windings to form a multi-layer coil and then flowing current through this coil to generate heat for integrally fusing the wire.

The integral fixing of the movable coil 6 to the arm 5 is preferably conducted by injection molding. In the injection process, the die-cast arm 5 and the movable coil 6 having lead wires 6a to which terminal pins 12 are soldered are placed in an injection mold, and a molten thermoplastic resin such as a polyphenylene sulfide containing glass fibers is injected into the mold. After solidification, the resulting molding is taken out of the mold. In this case, since the fingers 5a of the arm 5 are embedded in the hold member 9, the hold member 9 is prevented from being detached from the arm 5.

Figure 3:
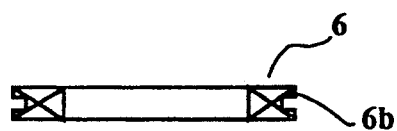
FIG. 3 is a cross-sectional view showing a movable coil according to another embodiment of the present invention.

FIG. 3 shows a movable coil 6 according to another embodiment of the present invention. In FIG. 3, 6b represents a circumferential groove is the movable coil 6 for preventing the movable coil 6 from being detached from the hold member 9. The groove 6b is formed in the windings of the movable coil 6. This groove 6b functions to increase the fixing strength of the movable coil 6 to the hold member 9.

Figure 4:
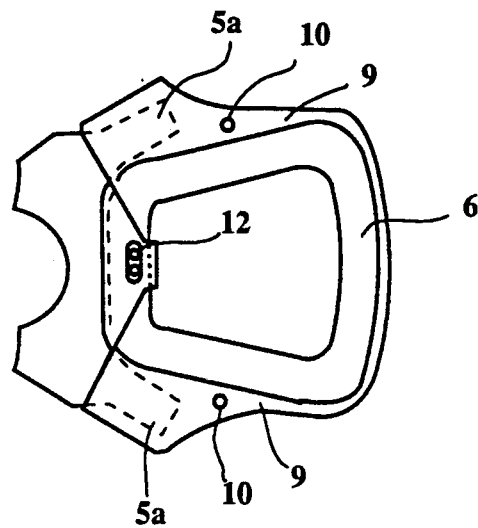
FIG. 4 is a schematic view showing the molding of a thermoplastic resin to form a hold member according to an embodiment of the present invention.

FIG. 4 shows the molding of a thermoplastic resin into the hold member 9 according to a further embodiment of the present invention. In FIG. 4, the same reference numerals are assigned to the same parts as those in FIGS. 1-3. In FIG. 4, 10 represents a pin gate through which a molten thermoplastic resin for the hold member 9 is injected into a mold (not shown).

Figure 5:
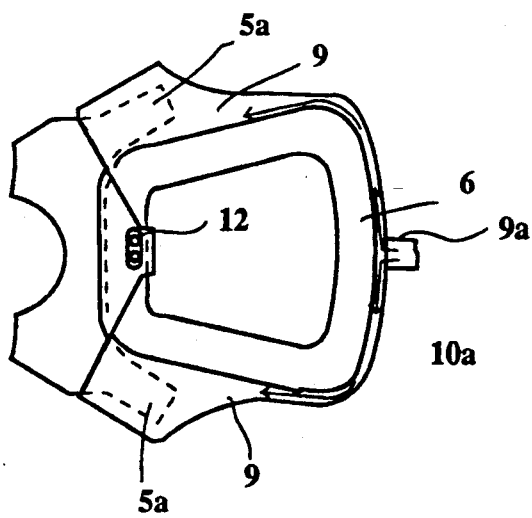
FIG. 5 is a schematic view showing the molding of a thermoplastic resin according to a different method from that shown in FIG. 4.

By this structure, molecular chains of the thermoplastic resin are oriented along the flow direction of the thermoplastic resin (thickness direction of the thermoplastic resin). Accordingly, the hold member 9 shows a large longitudinal modulus in this direction, resulting in improved rigidity. On the other hand, when an injection gate 10a is provided at a peripheral portion 9a of the hold member 9 as shown in FIG. 5, the thermoplastic resin flows along the arrows shown in FIG. 5. Accordingly, the hold member 9 fails to show a large longitudinal modulus in its thickness direction.

Figure 6A:
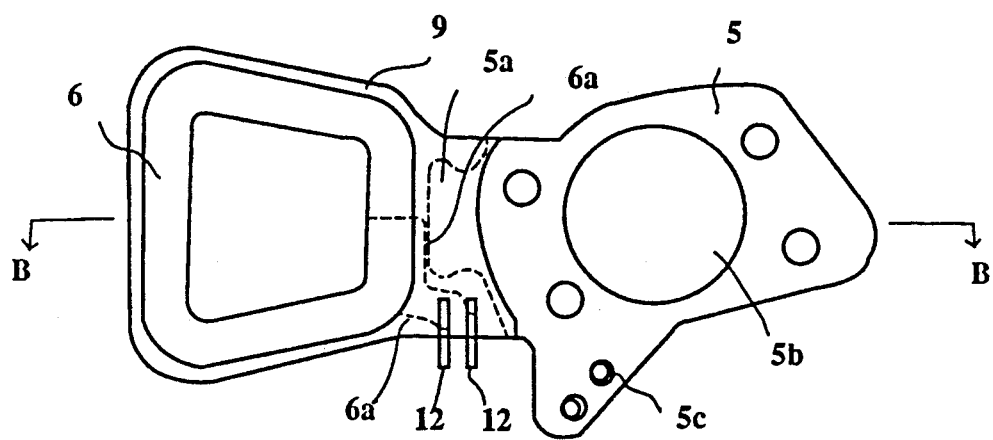
FIG. 6 (a) is a plan view showing the swing-type actuator according to a further embodiment of the present invention.
Figure 6B:
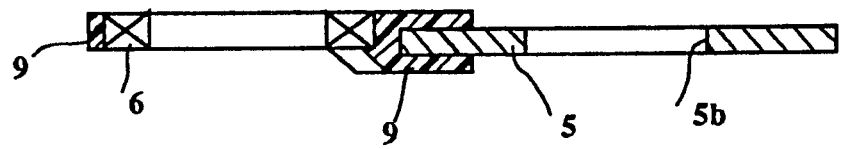

Next, for electric connection between the movable coil and an external power supply, the hold member 9 is provided with terminal pins 12, 12 as shown in FIG. 6. In FIG. 6, the same reference numerals are assigned to the same parts as in FIG. 1. In this case, the swing-type actuator is produced as follows: First, a die-cast aluminum arm 5 and a movable coil 6 having lead wires 6a, 6a each connected to terminal pins 12, 12 by soldering are placed in an injection mold and a molten thermoplastic resin is injected and solidified.

Figure 7:
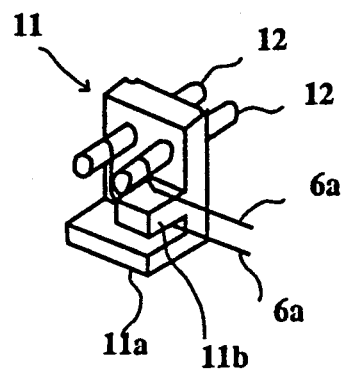
FIG. 7 is a perspective view showing a terminal block to be assembled in a swing-type actuator.

In order to prevent the lead wires 6a, 6a from being brought into contact with each other or to the arm 5 and/or a finger 5a by the flow of the molten thermoplastic resin, a terminal block can be used. One example of the terminal block is shown in FIG. 7. The terminal block 11 has terminal pins 12, 12 to which the lead wires 6a, 6a of the movable coil 6 are electrically connected by soldering. The terminal block 11 may be produced from a polyphenylene sulfide resin, etc. by injection molding. The terminal block 11 has a partition 11b between the terminal pins 12, 12, and a wall 11a for separating the lead wires 6a, 6a from each other and to keep electric insulation between them.

Figure 8A:
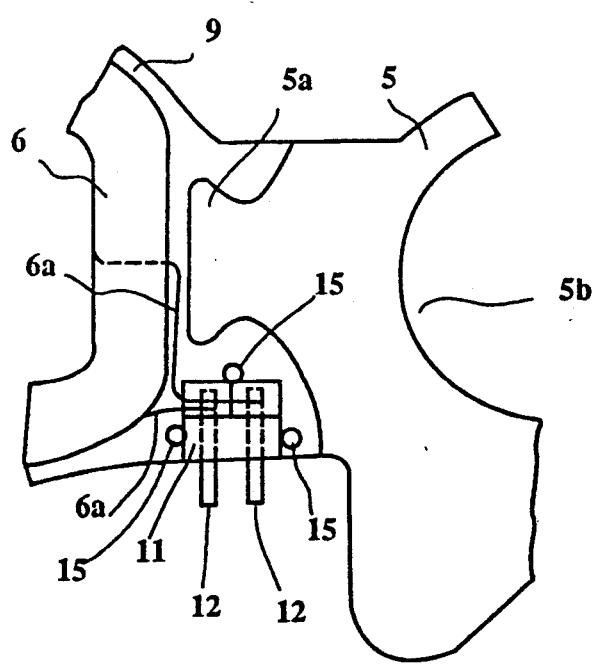
FIG. 8 (a) is a partial cross-sectional view showing an important portion of a swing-type actuator containing the terminal block of FIG. 7.
Figure 8B:
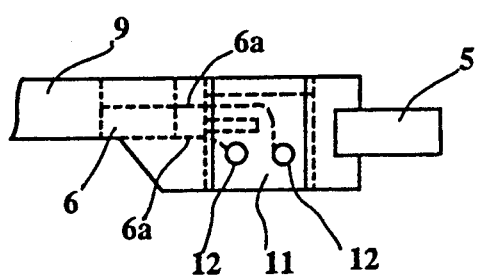

With this terminal block 11, the fixing of the movable coil 6 and the arm 5 is effectively conducted by injection molding as follows: First, the terminal block 11 can be accurately positioned in an injection mold by means of positioning pins 15 in contact with three sides of the terminal block 11 as shown in FIG. 8 (a). The positioning pins 15 are mounted to the injection mold in advance, and the terminal block 11 is inserted between them. Although the resulting hold member 9 has slight dents or cavities due to the positioning pins 15, such dents do not affect the strength of the hold member 9 at all, because the height of each positioning pin 15 is only 0.8-1.0 mm. By using the terminal block 11, the lead wires 6a, 6a near the terminal pins 12, 12 can be completely separated from each other by the partition 11b of the terminal block 11, and the lead wires 6a, 6a are prevented from coming into contact with the arm 5 and/or the finger 5a.

In this embodiment, a pair of terminal pins 12, 12 have the same length, but it is possible that one of the terminal pins 12, 12 nearer the movable coil 6 is shorter than the other terminal pin. By this structure, a pair of lead wires 6a, 6a can more efficiently be separated from each other.

The thermoplastic resins for constituting the hold member 9 may be selected depending upon rigidity and heat resistance required for the hold member 9. Examples of such thermoplastic resins include polybutylenephthalate resins, polyamide resins, polyimide resins, polyamideimide resins, polyester resins, etc. These thermoplastic resins are preferably heat-resistant resins. These resins should have longitudinal modulus of $10^5$ kg/cm$^2$ or more (measured according to ASTM D-638), and the longitudinal modulus is preferably $1.3 \times 10^5$ kg/cm$^2$ or more. Particularly, liquid crystal polymers are preferable, and particularly liquid crystal polyester resins are preferable.

The liquid crystal polyester resins include (a) copolymers of parahydroxybenzoic acid and polyethylene terephthalate, (b) copolymers of poly-p-hydroxybenzoate aromatic dicarboxylic acid and aromatic diol, (c) copolymers of poly-p-hydroxy-benzoate and naphthaoic acid, etc. From the aspect of strength and modulus, aromatic liquid crystal polyester resins (b), (c) are preferable, and (c) is more preferable. Particularly, since the aromatic polyester resins (c) have rigid molecular chains oriented in the flow direction in the molding process, they show large longitudinal modulus in that direction. In addition, they show good vibration-absorbing properties and small linear expansion coefficient (near that of metals).

The liquid crystal polymers show high fluidity and so can be easily molded when heated at a liquid crystal temperature lower than a melting point. Particularly, liquid crystal polymers having longitudinal modulus (tensile modulus) of $1.6 \times 10^5$ kg/cm$^2$ or more are preferable. Specific examples of such aromatic thermotropic liquid crystal polyester resins include Bectra A130 (longitudinal modulus: $18 \times 10^4$ kg/cm$^2$), C130 ($16 \times 10^4$ kg/cm$^2$), A230 ($30 \times 10^4$ kg/cm$^2$), B230 ($38 \times 10^4$ kg/cm$^2$), A410 ($21 \times 10^4$ kg/cm$^2$), A422 ($18 \times 10^4$ kg/cm$^2$) C400 ($17 \times 10^4$ kg/cm$^2$) and A540 ($16 \times 10^4$ kg/cm$^2$) each manufactured by Celanese; XYDAR RC-210 ($16.2 \times 10^4$ kg/cm$^2$) and G-43C ($16.1 \times 10^4$ kg/cm$^2$) manufactured by Dartco, etc. Incidentally, the longitudinal modulus is $220 \times 10^4$ kg/cm$^2$ (steel), $68 \times 10^4$ 4 kg/cm$^2$ (aluminum), $4.2 \times 10^4$ kg/cm$^2$ (methacrylic resins), $3.2-3.6 \times 10^4$ kg/cm$^2$ (polystyrene resins), $10^5$ kg/cm$^2$ (polyphenylene sulfide resins). Accordingly, these liquid crystal polymers show larger rigidity than general thermoplastic resins.

To increase mechanical strength and heat resistance, glass fibers, carbon fibers, etc. may be added to these liquid crystal polymers. The amount of such fillers is 10-50 weight %, preferably 20-40 weight %.

In the present invention, thermoplastic resins having flexural modulus of $1.3 \times 10^5$ kg/cm$^2$ or more (measured according to ASTM D-792) can also be effectively used. Such resins include, in addition to the above-mentioned resins including Bectra A130 (flexural modulus: $15 \times 10$ kg/cm$^2$), C130 ($14 \times 10^4$ kg/cm$^2$), A230 ($29 \times 10^4$ kg/cm$^2$), B230 ($36 \times 10^4$ kg/cm$^2$), A410 ($18 \times 10^4$ kg/cm$^2$), A422 ($17 \times 10^4$ kg/cm$^2$), A540 ($14 \times 10^4$ kg/cm$^2$), XYDAR RC-210 ($13.6 \times 10^4$ kg/cm$^2$, G-43C ($14.9 \times 10^4$ kg/cm$^2$), polyphenylene sulfides such as Ryton R-4 ($14 \times 10^4$ kg/cm$^2$) manufactured by Phillips Petroleum; DIC.PPS FZ-1140 ($14 \times 10^4$ kg/cm) manufactured by Dainippon Ink and Chemicals, ASAHI.PPS RG-40JA ($14.4 \times 10^4$ kg/cm$^2$) manufactured by Asahi Glass; Fortron 1140A1 ($13 \times 10^4$ kgcm/$^2$) manufactured by Polyplastics, GS-40 ($15 \times 10^4$ kg/cm$^2$), G-10 ($20 \times 10^4$ kg/cm$^2$), G-6 ($18 \times 10^4$ kg/cm$^2$), G-4F ($14 \times 10^4$ kg/cm$^2$) and AC-5 ($16 \times 10^4$ kg/cm$^2$) manufactured by Tosoh Susteel, etc.

In the above embodiment, the actuators for magnetic heads are described, but it should be noted that the integrally molded actuator arm of the swing-type actuator of the present invention can be applicable not only to magnetic heads but also to optical heads, etc.

The swing-type actuator according to the present invention has the following advantages:

(1) The movable coil can be positioned accurately, and the reliability of fixing thereof is significantly increased.
(2) Since the lead wires of the movable coil can be handled simultaneously with molding, the production and assembly costs are reduced.
(3) Each part can be miniaturized and made thin and light, resulting in an improved response speed in the actuator.
(4) Electric insulation can be completely achieved between the lead wires of the movable coil and between the lead wires and the arm.

What is claimed is:

1. A swing-type actuator comprising:
   (a) a housing comprising two yokes and permanent magnets attached to said yokes with their different magnetic poles opposing each other, a magnetic gap existing between the opposing permanent magnets;
   (b) a coil having a periphery, and a thickness for being movable through said magnetic gap;
   (c) a swingable arm having one end adapted to receive said movable coil and an other end to which a function member is fixable; and
   (d) a hold member encompassing said coil periphery and joining said coil to said one arm end such that said movable coil is swingable in said magnetic gap, said movable coil being integrally fixed to said one arm end by said hold member, and said hold member being made of a thermoplastic resin having a modulus of $10^5$ kg/cm$^2$ or more and having substantially the same thickness as said movable coil.

2. The swing-type actuator according to claim 1, wherein said thermoplastic resin is a liquid crystal polymer.

3. A swing-type actuator comprising:
   (a) a housing comprising two yokes and permanent magnets attached to said yokes with their different magnetic poles opposing each other, a magnetic gap existing between the opposing permanent magnets;
   (b) a coil having a periphery, and a thickness for being movable through said magnetic gap;
   (c) a swingable arm having one end adapted to receive said movable coil and an other end to which a function member is fixable; and
   (d) a hold member joining said coil to said one arm end such that said movable coil is swingable in said magnetic gap, said movable coil being integrally fixed to said one arm end by said hold member, said hold member being made of a thermoplastic resin, and said arm being provided with at least one finger which is embedded in said hold member to prevent said arm from being detached from said hold member.

4. The swing-type actuator according to claim 3, wherein said thermoplastic resin has a modulus of $10^5$ kg/cm$^2$ or more.

5. The swing-type actuator according to claim 4, wherein said thermoplastic resin is a liquid crystal polymer.

6. A swing-type actuator comprising:
   (a) a housing comprising two yokes and permanent magnets attached to said yokes with their different magnetic poles opposing each other, a magnetic gap existing between the opposing permanent magnets;
   (b) a coil having a periphery, at least two lead wires, and a thickness for being movable through said magnetic gap;
   (c) a swingable arm having one end adapted to receive said movable coil and an other end to which a function member is fixable;
   (d) a hold member joining said coil to said one arm end such that said movable coil is swingable in said magnetic gap, and (e) a terminal block made of a thermoplastic resin and having a pair of terminal pins electrically connected to said two lead wires of said movable coil and a partition projecting near said terminal pins for separating said two lead wires from each other, said one arm end, said movable coil and said terminal block being integrally fixed by said hold member, said hold member being made of a thermoplastic resin.

7. The swing-type actuator according to claim 6, wherein said thermoplastic resin has a modulus of $10^5$ kg/cm$^2$ or more.

8. The swing-type actuator according to claim 7, wherein said thermoplastic resin is a liquid crystal polymer.

9. The swing-type actuator according to claim 3 wherein said hold member encompasses the periphery of said movable coil.

10. The swing-type actuator according to claim 6 wherein said hold member encompasses the periphery of said movable coil.

11. The swing-type actuator according to claim 3 wherein said hold member has substantially the same thickness as said movable coil.

12. The swing-type actuator according to claim 6 wherein said hold member has substantially the same thickness as said movable coil.

13. The swing-type actuator according as in claim 1 wherein the resin material of thermoplastic hold member is molecularly oriented to provide increased flexural modulus in the plane of said arm.

14. The swing-type actuator according as in claim 3 wherein the resin material of thermoplastic hold member is molecularly oriented to provide increased flexural modulus in the plane of said arm.

15. The swing-type actuator according as in claim 6 wherein the resin material of thermoplastic hold member is molecularly oriented to provide increased flexural modulus in the plane of said arm.

16. A swing-type actuator comprising:
(a) a housing comprising yoke means and permanent magnet means for defining a magnetic gap;
(b) a coil having a periphery and a thickness for being movable through said magnetic gap;
(c) a swingable arm having one end adapted to receive said movable coil and another end to which a function member is fixable; and
(d) a hold member encompassing said coil periphery and joining said coil to said one arm end such that said movable arm is swingable in said magnetic gap, said movable coil being integrally fixed to said one arm end by said hold member, and said hold member being made of a thermoplastic resin having a modulus of $10^5$ kg/cm$^2$ or more and having substantially the same thickness as said movable coil.

17. A swing-type actuator comprising:
(a) a housing comprising yoke means and permanent magnet means for defining a magnetic gap;
(b) a coil having a periphery and a thickness for being movable through said magnetic gap;
(c) a swingable arm having one end adapted to receive said movable coil and another end to which a function member is fixable; and
(d) a hold member joining said coil to said one arm end such that said movable arm is swingable in said magnetic gap, said movable coil being integrally fixed to said one arm end by said hold member, and said hold member being made of a thermoplastic resin, and said arm being provided with at least one finger which is embedded in said hold member to prevent said arm from being detached from said hold member.

18. The swing-type actuator according to claim 16, wherein said thermoplastic resin is a liquid crystal polymer.

19. The swing-type actuator according to claim 17, wherein said thermoplastic resin has a modulus of $10^5$ kg/cm$^2$ or more.

20. The swing-type actuator according to claim 19, wherein said thermoplastic resin is a liquid crystal polymer.

21. The swing-type actuator according to claim 17, wherein said hold member has substantially the same thickness as said movable coil.

22. The swing-type actuator according to claim 16, wherein the resin material of thermoplastic hold member is molecularly oriented to provide increased flexural modulus in the plane of said arm.

23. The swing-type actuator according to claim 17, wherein the resin material of thermoplastic hold member is molecularly oriented to provide increased flexural modulus in the plane of said arm.

* * * * *